United States Patent
Hawes

[15] 3,672,323
[45] June 27, 1972

[54] EMERGENCY SIGN ASSEMBLY

[72] Inventor: Edward L. Hawes, 405 East Goulson, Hazel Park, Mich. 48030

[22] Filed: Jan. 19, 1971

[21] Appl. No.: 107,721

Related U.S. Application Data

[63] Continuation-in-part of Ser. No. 747,208, July 24, 1968, abandoned.

[52] U.S. Cl. .................................116/28, 40/129 C, 116/28, 248/42
[51] Int. Cl. ..........................................................B60q
[58] Field of Search ...............116/63, 63 P, 173, 28; 248/38, 248/43, 39, 42; 340/84, 97; 24/129; 40/129 C

[56] References Cited

UNITED STATES PATENTS

| | | | |
|---|---|---|---|
| 1,086,238 | 2/1914 | Storey | 40/128 |
| 2,922,152 | 1/1960 | Del Conte | 340/84 X |
| 3,135,235 | 6/1964 | Romano | 116/63 P |
| 3,351,904 | 11/1967 | Noruk | 340/97 |
| 3,589,328 | 7/1969 | Kiniry | 116/63 P |

FOREIGN PATENTS OR APPLICATIONS

| | | | |
|---|---|---|---|
| 443,071 | 1/1968 | Switzerland | 116/63 P |

Primary Examiner—Louis J. Capozi
Attorney—Hauke, Gifford and Patalidis

[57] ABSTRACT

A sign assembly for use with automobiles, trucks or the like to warn traffic that a vehicle ahead is disabled. The assembly includes a reflectorized, triangular sign which is collapsible for storage and a clip and extension for fastening the sign to the upper edge of an automobile window and for positioning the sign above the roof of the automobile so that it can be seen by approaching traffic.

10 Claims, 8 Drawing Figures

INVENTOR
EDWARD L. HAWES
BY

INVENTOR
EDWARD L. HAWES

EMERGENCY SIGN ASSEMBLY

The present application is a continuation-in-part of now abandoned patent application Ser. No. 747,208 filed July 24, 1968.

BACKGROUND OF THE INVENTION

I. Field of the Invention

The present invention relates to sign construction and more particularly to a collapsible sign assembly for providing a warning to traffic of a disabled vehicle or other emergency situation.

II. Description of the Prior Art

Emergency signs for vehicles and the like have heretofore taken many forms but generally they have included some type of sign designed to be attached to the automobile and to convey a message indicating the nature of the distress. There has been little effort to use such signs not only as a means of soliciting help but also to warn other vehicles of the danger of the parked disabled vehicle. The most commonly used method of providing the latter type of warning has been the use of flares. Flares require matches and can only be used once so that they are not entirely satisfactory. Recently and especially with the increase in high speed expressway driving a definite need for such a warning sign assembly has become apparent. Such a sign assembly should be readily visible, capable of being conveniently stored between use, and be readily assembled for use when the need arises.

SUMMARY OF THE PRESENT INVENTION

The present sign assembly meets these requirements by providing a sign of generally triangular configuration including a detachable supporting member for attaching the sign to a window edge of the automobile for maintaining it in a position above the roof of the vehicle. The sign collapses for storage by means of a connection at the apex of the triangle which when disconnected permits the sides of the triangle to be folded down onto the base.

DESCRIPTION OF THE DRAWINGS

A better understanding of the present invention will be achieved upon reference to the following description of several preferred embodiments thereof. The description makes reference to the following drawings in which like reference characters refer to like parts throughout the several views and in which.

DESCRIPTION OF THE PREFERRED EMBODIMENTS

Figure 1:
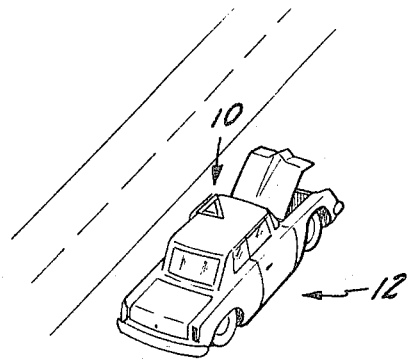
FIG. 1 is a perspective view illustrating a sign member of the present invention in use.

Now referring to the drawings for a more detailed description of the present invention, a preferred sign is illustrated in FIG. 1 as including a triangular sign member 10 adapted to be positioned above the roof of an automobile 12. By positioning the sign 10 above the roof of the automobile it is sufficiently visible to give ample warning to traffic approaching the disabled vehicle from either direction.

Figure 2:
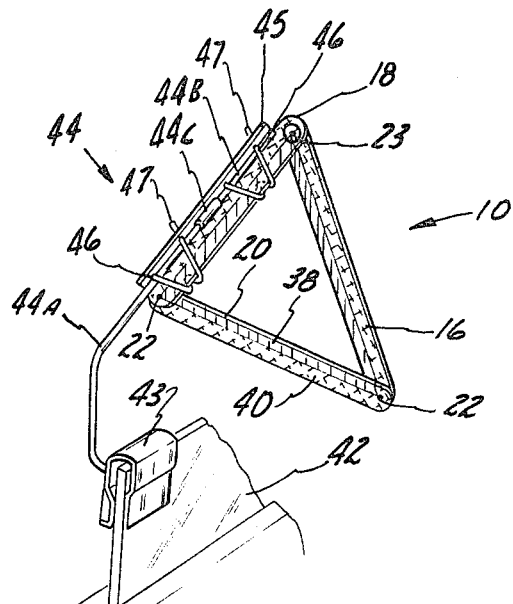
FIG. 2 is an enlarged perspective view of the sign member illustrated in FIG. 1 and illustrating the manner of attachment to a vehicle.

The sign member 10 as can best be seen in FIG. 2, is preferably of an equilateral triangular configuration having sides 16 and 18 joined to a base 20 by means of pivotal connections 22 and to each other by a snap connection generally indicated at 23. The ends of the sides 16 and 18 are preferably disposed on opposite sides of the base 20 so that when the snap connection 23 is disconnected, the sides 16 and 18 will pivot downwardly to a position adjacent to and on opposite sides of the base 20. It is apparent that if desired the snap connection 23 could be provided at the intersection of one of the sides with the base with the pivotal connections being provided at the other intersections. Even with this arrangement if the sides 16 and 18 are sufficiently long, they would still fold down on either side of the base 20.

The snap connection 23 is of a conventional construction and is of the type commonly used to attach one piece of fabric to another such as in clothing or the like and comprises a female member carried at the upper end of the side 18 and a male member carried at the upper end of the side 16 and adapted to be received by the female member to thereby connect the ends of the sides 16 and 18 one to the other.

At least one face of the sides 16 and 18 and the base 20, and preferably both faces, are provided with alternate strips of reflecting material 38 and material 40 commonly called "day glow" fluorescent materials. These provide the necessary reflection and visibility to attract the attention of motorists.

Figure 4:
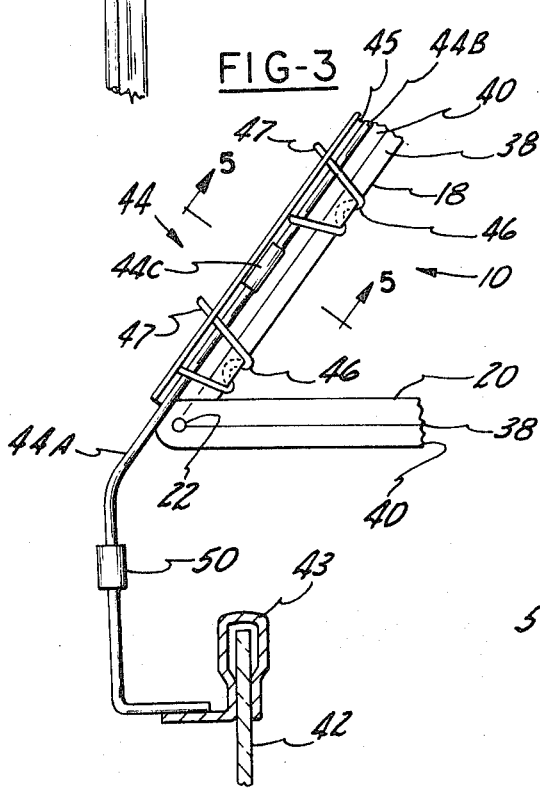
FIG. 4 is an enlarged fragmentary elevational view of the sign member of FIG. 2, including a preferred modification thereof.
Figure 5:
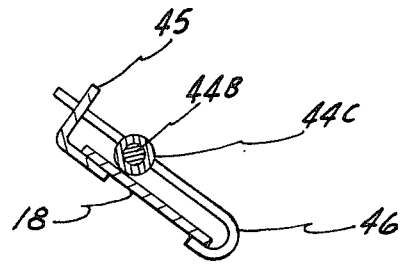
FIG. 5 is a cross sectional view taken substantially along line 5—5 of FIG. 4.

As can best be seen in FIGS. 2 and 4 the sign 10 includes means for attaching the assembly to the upper edge of a door window 42. This latter means includes a clip 43 for attachment to the upper edge of the window 42 and a two piece extension 44 having a lower part 44A fixed directly to the clip 43 and an upper part 44B having a threaded end receivable in a threaded socket 44C carried at the upper end of the lower part 44A. The side 18 is provided with an angle member 45 at its outside edge and hooks are carried by the extension 44 and connect around the inside edge of the side 18 as can best be seen in FIG. 5, to mount the sign member 10 to the vehicle 12. An end 47 of the hook 46 extends through holes provided in the angle member 45 to aid in locking the sign member 10 to the extension 44. The extension 44 is bent to follow the curvature of the roof of the automobile so that with the sign member 10 attached to the extension 44, the sign member 10 is positioned above the roof of the automobile 12 with the faces of the sides 16 and 18 and the base 20 facing forwardly and rearwardly as best shown in FIG. 1 to give the sign maximum exposure to traffic approaching from either direction.

The two piece construction of the extension 44 permits the length to be reduced sufficiently on disassembly of the sign member 10 to enable the sign member to be stored in a smaller area than would be possible if the extension 44 were of one piece. It is clear, however, that where there is sufficient area and to reduce costs, the extension 44 could, if desired, be made in one piece. The extension 44 can be detached from the side 18 by unsnapping the snap connection 23 and freeing the ends 47 of the hooks 46 from the angle member 45 and then sliding the hooks 46 past the free end of the side 18.

Figure 3:
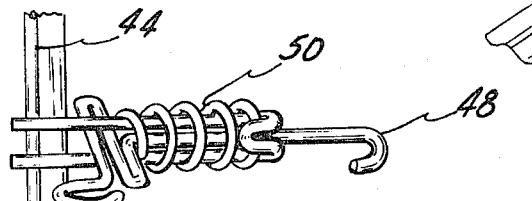
FIG. 3 is a fragmentary view of an alternate construction for a portion of the sign member of FIG. 2.

FIG. 3 shows an alternate construction for the hooks 46 in which the ends 48 are biased into engagement with the inside edge of the side 18 by a spring 50 to more securely lock the sign member 10 to the extension 44 and to provide for easier detachment of the extension 44 from the side 18.

Figure 6:
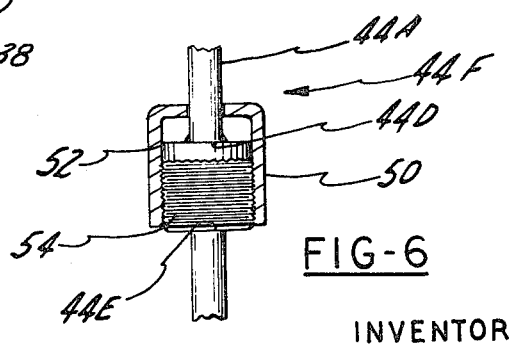
FIG. 6 is a fragmentary cross sectional view of a portion of the structure shown in FIG. 4.

FIGS. 4 and 6 illustrate a modification of the extension 44 to permit the sign member 10 to be rotated to any position with respect to the roof of the automobile so that the sign member 10 can be positioned on automobiles with different space and angular relationships between the windows and the roof. This modification permits the sign member 10 to be positioned to achieve the greatest visibility and to be locked in that position.

As can best be seen in FIG. 6, the modification includes an extension 44A to be cut to form ends 44D and 44E. The end 44D extends through a nut member 50 which is prevented from separating from end 44D by a serrated washer 52. The washer 52 is fixed to the end 44D by any means such as welding and with the serrations disposed at the free end as shown. The end 44E is provided with an externally threaded member 54 adapted to be received by the nut member 50 and provided at its free end with serrations to mate with the serrations of washer 52.

In this way the nut 50 can be loosened to permit axial separation of the ends 44D and 44E. With these ends separated they can be rotated with respect to each other to any desired position and upon tightening the nut 50 the serrations will maintain the members in that rotated position.

Figure 7:
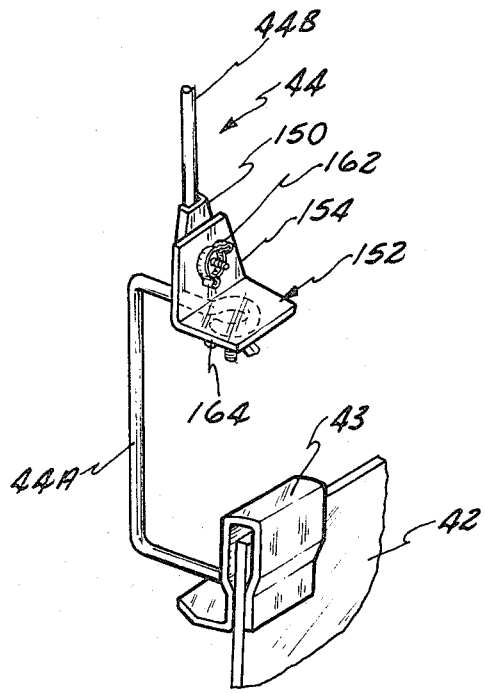
FIG. 7 is a fragmentary view of a portion of another preferred modification of the present invention.
Figure 8:
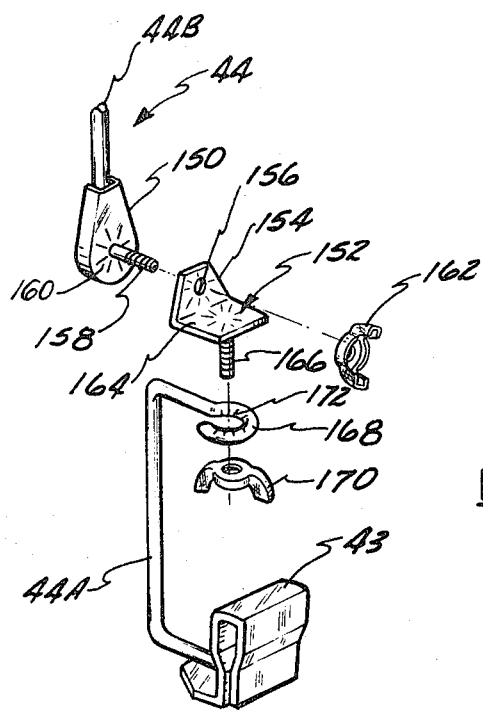
FIG. 8 is an exploded view of the preferred modification shown in FIG. 7.

FIGS. 7 and 8 illustrate still another preferred modification of the present invention which includes means for rotating the upper part 44B of the extension about two axes and with respect to the lower part 44A to accommodate a wide range of window and roof configurations.

As can best be seen in FIG. 8 the upper extension 44B has welded or secured thereto a flange 150. An angle bracket 152 has an upper vertical portion 154 with a hole 156 adapted to receive a bolt 158 extending from the flange 150. The vertical portion 154 is provided with radial serrations (not shown) which engage with serrations 160 provided on the flange 150 to lock the upper extension 44B in a rotated position about the bolt 158 when a wing nut 162 is tightened on the bolt 158.

The angle bracket 152 has a lower portion 164 substantially perpendicular to the upper portion 154 thereby lying in the horizontal plane. A bolt 166 is fastened in a generally vertical position to the lower portion 164 by any conventional fastening means such as spot welding or the like.

The lower extension 44A has its upper end bent in a horizontal plane and is looped as at 168 to receive the bolt 166. A wing nut 170 is provided to tighten an upper serrated surface 172 of the eyelet 168 against the lower serrated surface (not shown) of the angle bracket 152.

Thus after the clip 43 has been inserted over the window 42, the sign 10 is adjusted to the desired position over the roof of the automobile by, in turn, positioning the upper extension 44B with respect to the angle bracket 152, tightening the wing nut 162, then positioning the lower extension 44A with respect to the bracket 152 and tightening the wing nut 170. This of course provides a greater versatility for the sign 10 because adjustment about two axes permits the sign 10 to be positioned above the roof of automobiles having different window and roof configurations.

The sides 16 and 18 and the base 20 of the sign member 10 can be made of a number of different materials. However, since the sign member of the present invention is intended for use only in emergency situations and therefore they will not be used frequently, to keep the costs at a minimum, it is preferred to construct these portions of a waterproof cardboard or similar inexpensive material. The reflective portions of the sign members can be painted or can comprise strips of reflective and "day glow" tape applied to the sides and base if so desired.

The triangular configuration of the sign member not only permits it to be readily stored because it can be folded into a compact package, but also provides a sign which will remain in an upright position during use even through relatively high winds.

It is apparent that although I have described but one embodiment of my invention, many other changes and modifications can be made therein without departing from the spirit of the invention as expressed by the scope of the appended claims.

I claim:

1. A sign member comprising:
  a base, a pair of side members and means connecting said side members with said base and with each other to form a triangular configuration,
  said connecting means including at least one disconnectable connection whereby upon disconnection of said disconnectable connection said sides can be pivoted downwardly to a position adjacent said base,
  means for supporting said sign member in an upright position above the roof of an automobile, said last mentioned means comprising:
  an extension, said extension formed so that when the sign member is positioned in said upright position a first end of the extension lies adjacent to one of said side members while the second end of the extension is positioned near the top edges of a window of said automobile,
  means provided at the first end of said extension for connection with said side member and means provided at the second end of said extension for attaching said extension to the upper edge of said window.

2. The sign member as defined in claim 1 and including disconnectable means intermediate the ends of said extension whereby said extension can be disconnected to form two pieces for purposes of storage.

3. The sign member as defined in claim 1 and including means disposed intermediate the ends of said extension for permitting rotational adjustment between said ends whereby said sign member can be adjustably positioned above the roof of the automobile.

4. The sign assembly as defined in claim 3 and including means carried by said extension for locking said sign in a selected rotated position.

5. A sign assembly comprising:
  an elongated flat base and a pair of elongated flat sides and means joining said base and sides together to form a sign of an open center triangular configuration,
  said joining means comprising at least one snap connector and a pair of pivotal connectors with one of said connectors connecting the ends of said sides to each other and to said base,
  said snap connector being disconnectable whereby said sides can be pivoted to a position adjacent said base, and
  means for supporting said sign member in an upright position above the roof of an automobile, said last mentioned means comprising:
  an extension, said extension formed so that when the sign member is positioned in said upright position a first end of the extension lies adjacent to one of said side members while the second end of the extension is positioned near the top edges of a window of said automobile,
  means provided at the first end of said extension for connection with said side member and means provided at the second end of said extension for attaching said extension to the upper edge of said window.

6. The sign assembly as defined in claim 5 and in which said last mentioned means comprises a clip member adapted for attachment to the edge of a window of a vehicle, an extension connected with said clip member at one end and means attaching the opposite end of said extension to said sign.

7. The sign assembly as defined in claim 6 and including means carried by said extension for locking said sign in a selected rotated position.

8. The sign assembly as defined in claim 6 and including means separating said extension into at least two pieces.

9. A sign member comprising:
  means forming at least one indicia bearing face,
  means for supporting said indicia bearing face over the roof of an automobile or the like in a position in which said indicia bearing face is visible above the roof of the automobile or the like, said last mentioned means comprising:
  an extension, said extension formed so that when the indicia bearing face is positioned over the roof of an automobile or the like a first end of the extension lies adjacent to said indicia bearing face while the second end of the extension is positioned near the top edges of a window of the automobile,
  means provided at the first end of said extension for connection with said indicia bearing face and means provided at the second end of said extension for attaching said extension to the upper edge of said window.

10. The sign member as defined in claim 9 and including means disposed intermediate the ends of said extension for permitting rotational adjustment between said ends whereby said indicia bearing face can be adjustably positioned on the roof of the automobile.

* * * * *